(12) United States Patent
Akahori (10) Patent No.: US 11,176,413 B2
(45) Date of Patent: Nov. 16, 2021

(54) APPARATUS, METHOD, AND PROGRAM FOR TRAINING DISCRIMINATOR DISCRIMINATING DISEASE REGION, DISCRIMINATOR DISCRIMINATING DISEASE REGION, DISEASE REGION DISCRIMINATION APPARATUS, AND DISEASE REGION DISCRIMINATION PROGRAM

(71) Applicant: FUJIFILM Corporation, Tokyo (JP)

(72) Inventor: Sadato Akahori, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 16/584,866

(22) Filed: Sep. 26, 2019

(65) Prior Publication Data

US 2020/0104634 A1 Apr. 2, 2020

(30) Foreign Application Priority Data

Oct. 1, 2018 (JP) .............................. JP2018-186790

(51) Int. Cl.
*G06K 9/00* (2006.01)
*G06K 9/62* (2006.01)
(Continued)

(52) U.S. Cl.
CPC ......... *G06K 9/6234* (2013.01); *G06K 9/6256* (2013.01); *G06T 3/0068* (2013.01);
(Continued)

(58) Field of Classification Search
CPC .............. G06K 9/6234; G06K 2209/05; G06T 7/0014; G06T 3/0068; G06T 2207/10088;
(Continued)

(56) References Cited

U.S. PATENT DOCUMENTS 10,825,168 B2\* 11/2020 Tegzes ................. G06T 7/0012
2015/0112182 A1\* 4/2015 Sharma ................ A61B 5/7264
600/408

(Continued)

FOREIGN PATENT DOCUMENTS

| JP | H08251404 | 9/1996 |
| JP | 2013165765 | 8/2013 |
| JP | 2018505705 | 3/2018 |

*Primary Examiner* — Van D Huynh
(74) *Attorney, Agent, or Firm* — JCIPRNET (57) ABSTRACT

A discriminator includes a common learning unit and a plurality of learning units that are connected to an output unit of the common learning unit. The discriminator is trained, using a plurality of data sets of a first image obtained by capturing an image of a subject that has developed a disease and an image data of a disease region in the first image, such that information indicating the disease region is output from a first learning unit in a case in which the first image is input to the common learning unit. In addition, the discriminator is trained, using a plurality of data sets of an image set obtained by registration between the first image and a second image whose type is different from the type of the first image, such that an estimated image of the second image is output from an output unit of a second learning unit.

20 Claims, 6 Drawing Sheets

(51) Int. Cl.
*G06T 7/00* (2017.01)
*G06T 3/00* (2006.01)

(52) U.S. Cl.
CPC ........ *G06T 7/0014* (2013.01); *G06K 2209/05* (2013.01); *G06T 2207/10081* (2013.01); *G06T 2207/10088* (2013.01); *G06T 2207/20081* (2013.01); *G06T 2207/20084* (2013.01); *G06T 2207/30016* (2013.01)

(58) Field of Classification Search
CPC . G06T 2207/30016; G06T 2207/20081; G06T 2207/20084; G06T 2207/10081; G06T 7/11
USPC ......................................................... 382/131
See application file for complete search history.

(56) References Cited

U.S. PATENT DOCUMENTS

| | | | | |
|---|---|---|---|---|
| 2015/0170002 A1* | 6/2015 | Szegedy | ............. | G06K 9/4628 |
| | | | | 382/156 |
| 2015/0238148 A1* | 8/2015 | Georgescu | ........... | G06K 9/4628 |
| | | | | 600/408 |
| 2016/0093050 A1* | 3/2016 | Kim | ........................ | G06K 9/46 |
| | | | | 382/128 |
| 2016/0174902 A1* | 6/2016 | Georgescu | ........... | G06T 7/0012 |
| | | | | 600/408 |
| 2017/0372497 A1 | 12/2017 | Hu et al. | | |
| 2018/0137244 A1* | 5/2018 | Sorenson | ............... | G16H 50/20 |
| 2020/0085394 A1* | 3/2020 | Turcea | ................... | A61B 6/485 |

\* cited by examiner

APPARATUS, METHOD, AND PROGRAM FOR TRAINING DISCRIMINATOR DISCRIMINATING DISEASE REGION, DISCRIMINATOR DISCRIMINATING DISEASE REGION, DISEASE REGION DISCRIMINATION APPARATUS, AND DISEASE REGION DISCRIMINATION PROGRAM

CROSS-REFERENCE TO RELATED APPLICATIONS

The present application claims priority under 35 U.S.C. § 119 to Japanese Patent Application No. 2018-186790, filed on Oct. 1, 2018. Each of the above application is hereby expressly incorporated by reference, in its entirety, into the present application.

BACKGROUND OF THE INVENTION

1. Field of the Invention

The present disclosure relates to an apparatus, method, and a non-transitory computer readable recording medium storing a program for training a discriminator discriminating a disease region, a discriminator discriminating a disease region, a disease region discrimination apparatus, and a non-transitory computer readable recording medium storing a disease region discrimination program.

2. Description of the Related Art

In recent years, advances in medical apparatuses, such as a computed tomography (CT) apparatus and a magnetic resonance imaging (MRI) apparatus, have made it possible to perform image diagnosis using high-resolution medical images with higher quality. In particular, in a case in which a target part is the brain, image diagnosis using, for example, CT images and MR images makes it possible to specify regions causing cerebrovascular disorders, such as cerebral infarction and cerebral hemorrhage. Therefore, various methods for supporting image diagnosis have been proposed.

For example, JP2013-165765A discloses a method which detects a cerebral infarction part included in an MRI diffusion-weighted image (DWI), acquires, from an abnormal part of the diffusion-weighted image and a diffusion-weighted image of a healthy person, position conversion data required for anatomical registration therebetween, converts a single photon emission computed tomography (SPECT) image captured by a SPECT apparatus on the basis of the position conversion data such that the position of each tissue of the brain of the patient is matched with the position of each tissue of the brain of the healthy person, and discriminates the cerebral infarction part on the SPECT image. In addition, JP2018-505705A discloses a method which inputs an MR image, applies conversion using machine learning to the input MR image to generate a CT image, and performs diagnosis using the images of a plurality of modalities including the generated CT image.

Further, JP1996-251404A (JP-H08-251404A) discloses a discrimination apparatus that comprises first and second neural networks each of which includes an input layer, an intermediate layer, and an output layer and which are connected to each other such that an output from the input layer to the intermediate layer in the first neural network is input to the input layer of the second neural network. In the discrimination apparatus disclosed in JP1996-251404A (JP-H08-251404A), the discrimination result of a region attribute of image data is output on the basis of the image data input to the first neural network. The use of the discrimination apparatus makes it possible to discriminate specific medical characteristics included in the above-mentioned medical image.

Thrombolytic therapy using a therapeutic agent, such as alteplase, is performed for cerebral infarction patients. However, it has been known that the thrombolytic therapy is applied within 4.5 hours from the time when no cerebral infarction has been confirmed and the risk of bleeding after treatment becomes higher as an infarction range becomes wider over time. Therefore, it is necessary to quickly and appropriately discriminate the infarction range using medical images in order to determine whether the thrombolytic therapy is appropriate.

SUMMARY OF THE INVENTION

In contrast, it has been known that, in a case in which the infarction region is already wide, the possibility of bleeding is high. However, it is difficult even for a medical specialist to accurately capture the infarction region on the CT image and it is desirable to automatically extract and quantify the infarction region using a computer. For this reason, deep learning which has attracted attention in recent years can be applied as a method for automatically extracting the infarction region. Learning information including a plurality of data sets of CT images and correct infarction regions in the CT images is required for deep learning. However, since the infarction region is not always clear on the CT image, it is difficult to prepare a large amount of data indicating the correct infarction region in the CT image.

The present disclosure has been made in view of the above-mentioned problems and an object of the present disclosure is to provide a technique that discriminates a disease region with high accuracy, using a limited amount of data, even in an image in which it is difficult to prepare a large amount of data indicating a correct disease region.

According to the present disclosure, there is provided a learning method that trains a discriminator comprising a common learning unit that includes an input unit and an output unit and a plurality of learning units each of which includes an input unit which is connected to the output unit of the common learning unit and an output unit. The learning method comprises: training the discriminator, using a plurality of data sets of a first image obtained by capturing an image of a subject that has developed a disease and a correct mask of a disease region in which a disease appears in the first image, such that information indicating the disease region is output from the output unit of a first learning unit among the plurality of learning units in a case in which the first image is input to the input unit of the common learning unit; and training the discriminator, using a plurality of data sets of an image set obtained by registration between the first image and a second image which is obtained by capturing an image of the same subject as described above and whose type is different from a type of the first image, such that an estimated image of the second image is output from the output unit of a second learning unit among the plurality of learning units in a case in which the first image is input to the input unit of the common learning unit.

Here, in the present disclosure, for example, a CT image acquired by administering a contrast medium to the subject and a CT image acquired without administering the contrast medium to the subject are referred to as "different types of images" even though the images are the same CT images. That is, images captured and acquired under slightly different imaging conditions are referred to as "different types of images". In addition, images acquired by different imaging principles, such as a CT image, an MR image, and a positron emission tomography (PET) image, are referred to as "different types of images".

In the learning method according to the present disclosure, the first image and the second image may be captured under different imaging conditions.

Here, in the present disclosure, the "imaging conditions" mean various conditions during imaging which include whether or not a contrast medium is administered to the subject, X-ray irradiation conditions, and a slice width.

In the learning method according to the present disclosure, the first image and the second image may be captured by different imaging principles.

Here, in the present disclosure, the "imaging principles" mean imaging methods, such as CT imaging, MR imaging, and PET imaging, in a case in which imaging is performed.

In the learning method according to the present disclosure, the first image may be a CT image and the second image may be an MR image.

In the learning method according to the present disclosure, the MR image may be a diffusion-weighted image.

In the learning method according to the present disclosure, the subject may be a brain of a patient that has developed cerebral infarction, and the disease region may be an infarction region.

In the learning method according to the present disclosure, each of the common learning unit and the plurality of learning units may be a neural network that comprises an input layer as the input unit, a plurality of intermediate layers, and an output layer as the output unit.

In addition, a non-transitory computer readable recording medium storing a program that causes a computer to perform the learning method according to the present disclosure may be provided.

According to the present disclosure, there is provided a learning apparatus that trains a discriminator comprising a common learning unit that includes an input unit and an output unit and a plurality of learning units each of which includes an input unit which is connected to the output unit of the common learning unit and an output unit. The learning apparatus trains the discriminator, using a plurality of data sets of a first image obtained by capturing an image of a subject that has developed a disease and a correct mask of a disease region in which a disease appears in the first image, such that information indicating the disease region is output from the output unit of a first learning unit among the plurality of learning units in a case in which the first image is input to the input unit of the common learning unit. In addition, the learning apparatus trains the discriminator, using a plurality of data sets of an image set obtained by registration between the first image and a second image which is obtained by capturing an image of the same subject as described above and whose type is different from a type of the first image, such that an estimated image of the second image is output from the output unit of a second learning unit among the plurality of learning units in a case in which the first image is input to the input unit of the common learning unit.

Another learning apparatus according to the present disclosure trains a discriminator comprising a common learning unit that includes an input unit and an output unit and a plurality of learning units each of which includes an input unit which is connected to the output unit of the common learning unit and an output unit and comprises a memory that stores commands executed by a computer and a processor that is configured to execute the stored commands. The processor trains the discriminator, using a plurality of data sets of a first image obtained by capturing an image of a subject that has developed a disease and a correct mask of a disease region in which a disease appears in the first image, such that information indicating the disease region is output from the output unit of a first learning unit among the plurality of learning units in a case in which the first image is input to the input unit of the common learning unit. In addition, the processor trains the discriminator, using a plurality of data sets of an image set obtained by registration between the first image and a second image which is obtained by capturing an image of the same subject as described above and whose type is different from a type of the first image, such that an estimated image of the second image is output from the output unit of a second learning unit among the plurality of learning units in a case in which the first image is input to the input unit of the common learning unit.

According to the present disclosure, there is provided a discriminator that is trained by any one of the learning method, the learning apparatus, or the recording medium according to the present disclosure.

According to the present disclosure, there is provided a disease region discrimination apparatus comprising: an image acquisition unit that acquires a first image which is a discrimination target; and the discriminator according to the present disclosure that discriminates a disease region in the first image which is the discrimination target.

The disease region discrimination apparatus according to the present disclosure may further comprise a display control unit that displays a discrimination result of the discriminator on a display unit.

According to the present disclosure, there is provided a non-transitory computer readable recording medium storing a disease region discrimination program that causes a computer to perform: a process of acquiring a first image which is a discrimination target; and a process of allowing the discriminator according to the present disclosure to discriminate a disease region in the first image which is the discrimination target.

Another non-transitory computer readable recording medium storing disease region discrimination program according to the present comprises a memory that stores commands executed by a computer and a processor that is configured to execute the stored commands. The processor performs: a process of acquiring a first image which is a discrimination target; and a process of allowing the discriminator according to the present disclosure to discriminate a disease region in the first image which is the discrimination target.

According to the apparatus, method, and non-transitory computer readable recording medium storing program for training a discriminator discriminating a disease region, the discriminator discriminating a disease region, the disease region discrimination apparatus, and non-transitory computer readable recording medium storing disease region discrimination program of the present disclosure, it is possible to discriminate a disease region, using a limited amount of data, even in an image in which it is difficult to prepare a large amount of data indicating a correct disease region.

DESCRIPTION OF THE PREFERRED EMBODIMENTS

Figure 1:
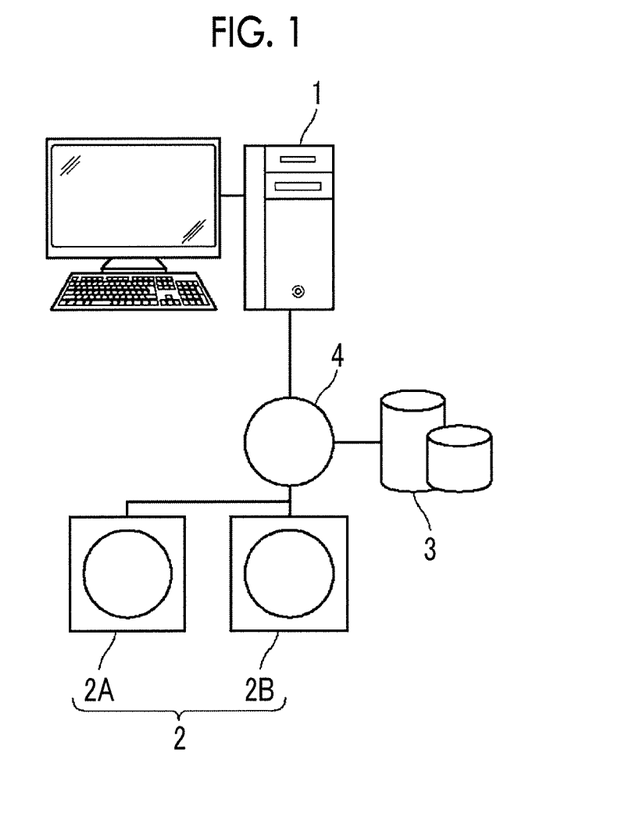
FIG. 1 is a hardware configuration diagram illustrating the outline of a diagnosis support system to which a disease region discrimination apparatus according to an embodiment of the present disclosure is applied.

Hereinafter, a first embodiment of the present disclosure will be described with reference to the drawings. FIG. 1 is a hardware configuration diagram illustrating the outline of a diagnosis support system to which a learning apparatus for training a discriminator, a discriminator, and a disease region discrimination apparatus according to an embodiment of the present disclosure are applied. As illustrated in FIG. 1, in the diagnosis support system, a disease region discrimination apparatus 1, a three-dimensional imaging apparatus 2, and an image storage server 3 according to this embodiment are connected so as to communicate with each other through a network 4. In addition, the disease region discrimination apparatus 1 includes the learning apparatus and the discriminator according to this embodiment.

The three-dimensional imaging apparatus 2 captures an image of a part of a subject to be diagnosed and generates a three-dimensional image indicating the part. Specifically, the three-dimensional imaging apparatus 2 is, for example, a CT apparatus, an MRI apparatus, or a PET apparatus. A medical image generated by the three-dimensional imaging apparatus 2 is transmitted to the image storage server 3 and is then stored therein. In this embodiment, a diagnosis target part of a patient that is the subject is the brain and the three-dimensional imaging apparatus 2 includes a CT apparatus 2A and an MRI apparatus 2B. The CT apparatus 2A generates a three-dimensional CT image Bc0 including the brain of the subject and the MRI apparatus 2B generates a three-dimensional MR image Bm0 including the brain of the subject. In this embodiment, the MR image Bm0 is a diffusion-weighted image. In addition, in this embodiment, the CT image Bc0 is a non-contrast-enhanced CT image acquired by imaging without using a contrast medium. However, a contrast-enhanced CT image acquired by imaging using a contrast medium may be used.

The image storage server 3 is a computer that stores and manages various types of data and comprises a high-capacity external storage device and database management software. The image storage server 3 performs communication with other apparatuses through the wired or wireless network 4 to transmit and receive, for example, image data. Specifically, the image storage server 3 acquires various types of data including image data of the CT image generated by the three-dimensional imaging apparatus 2 through the network, stores the acquired data in a recording medium, such as a high-capacity external storage device, and manages the data. In addition, the storage format of the image data and the communication between the apparatuses through the network 4 are based on a protocol such as Digital Imaging and Communication in Medicine (DICOM).

The disease region discrimination apparatus 1 is configured by installing a learning program and a disease region discrimination program according to the present disclosure in one computer. The computer may be a workstation or a personal computer that is directly operated by a doctor who performs diagnosis or may be a server computer that is connected with them through the network. The learning program and the disease region discrimination program are recorded on a recording medium, such as a digital versatile disc (DVD) or a compact disc read only memory (CD-ROM), and are then distributed. The learning program and the disease region discrimination program are installed in the computer from the recording medium. Alternatively, the learning program and the disease region discrimination program are stored in a storage device of a server computer connected to the network or a network storage so as to be accessed from the outside, are downloaded to the computer used by the doctor on request, and are then installed in the computer.

Figure 2:
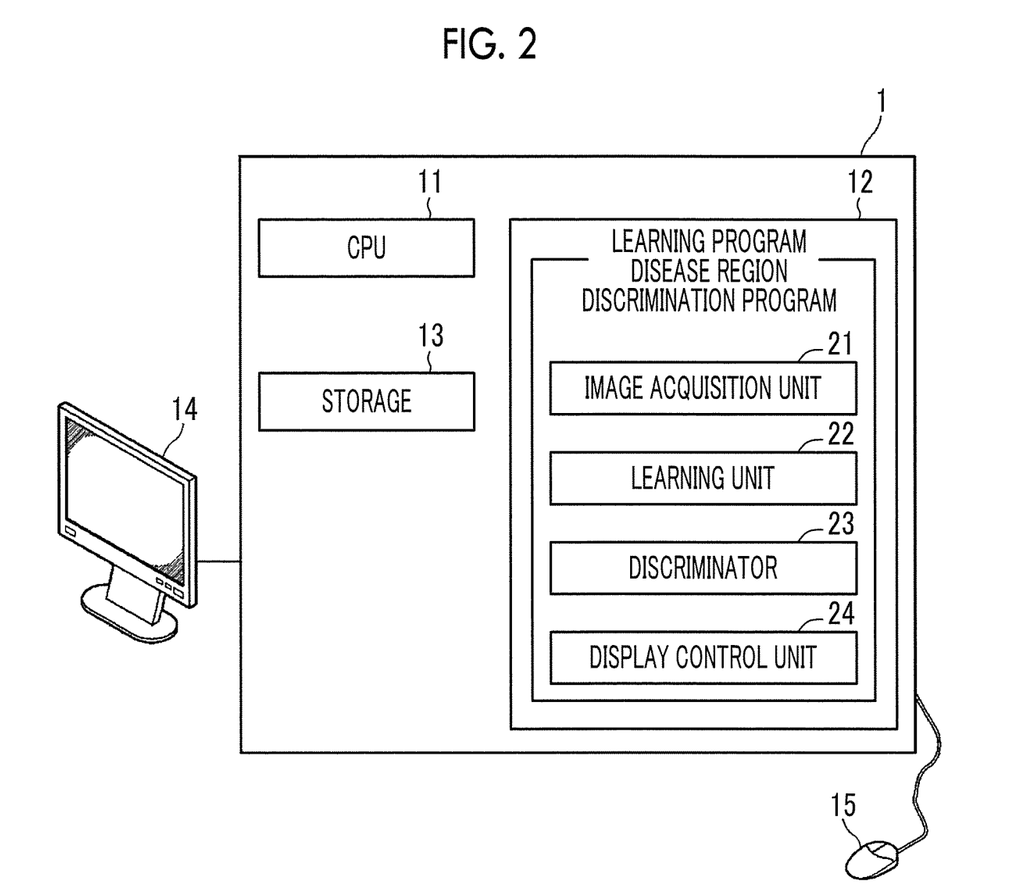
FIG. 2 is a block diagram schematically illustrating the configuration of the disease region discrimination apparatus according to the embodiment of the present disclosure.

FIG. 2 is a diagram schematically illustrating the configuration of the disease region discrimination apparatus according to the embodiment of the present disclosure which is implemented by installing the learning program and the disease region discrimination program in the computer. As illustrated in FIG. 2, the disease region discrimination apparatus 1 has the configuration of a standard workstation and comprises a central processing unit (CPU) 11, a memory 12, and a storage 13. In addition, a display unit 14, such as a liquid crystal display, and an input unit 15 including, for example, a keyboard and a mouse are connected to the disease region discrimination apparatus 1. The input unit 15 receives various setting inputs from the user. In addition, a touch panel may be used so as to function as both the display unit 14 and the input unit 15.

The storage 13 is, for example, a hard disk drive or a solid state drive (SSD). The storage 13 stores various kinds of information including the medical images of the subject and information required for processes which are acquired from the image storage server 3 through the network 4.

The memory 12 stores the learning program and the disease region discrimination program. The learning program is used to train a discriminator 23 comprising a first convolutional neural network (CNN) 31 (common learning unit) which will be described below, a second CNN 32 (first learning unit) which will be described below, and a third CNN 33 (second learning unit) which will be described below and defines, as the processes performed by the CPU 11, the following processes: a process which trains the discriminator, using a plurality of data sets of a CT image obtained by capturing an image of the brain that has developed infarction and a correct mask of an infarction region in which infarction appears in the CT image, such that information indicating the infarction region is output from an output unit of the second CNN 32 in a case in which the CT image is input to an input unit of the first CNN 31; and a process which trains the discriminator, using a plurality of data sets of an image set obtained by registration between a CT image and an MR image (including a diffusion-weighted image) which is obtained by capturing an image of the same brain as described above and whose type is different from the type of the CT image, such that an estimated image of the diffusion-weighted image is output from an output unit of the third CNN 33 in a case in which the CT image is input to the input unit of the first CNN 31. A correct mask is an image data that defines a disease region in which a disease appears in a medical image and a disease region is specified in a medical image. A correct mask is, for example, an image data having a pixel value of 1 for pixels in a disease region and a pixel value of 0 for pixels in the region other than a disease region.

In addition, the disease region discrimination program defines, as the processes performed by the CPU 11, the following processes: an image acquisition process that acquires a CT image which is a discrimination target; a discrimination process that discriminates an infarction region in the CT image which is a discrimination target; and a display control process that displays the discrimination result of the discriminator 23 on the display unit 14.

Then, the CPU 11 performs these processes according to the program such that the computer functions as an image acquisition unit 21, a learning unit 22, the discriminator 23 and a display control unit 24. Here, the learning unit 22 forms the learning apparatus for training the discriminator 23 according to this embodiment. In addition, the image acquisition unit 21, the discriminator 23, and the display control unit 24 form the disease region discrimination apparatus according to this embodiment.

The image acquisition unit 21 acquires the CT image Bc0 and the MR image Bm0 of the brain of the subject that has developed cerebral infarction from the image storage server 3 in order to train the discriminator 23 which will be described below. In addition, the image acquisition unit 21 acquires a CT image Bc1 in which an infarction region is to be discriminated from the image storage server 3 in order to discriminate the infarction region. In a case in which the CT image Bc0, the CT image Bc1, and the MR image Bm0 have been stored in the storage 13, the image acquisition unit 21 may acquire the CT image Bc0, the CT image Bc1, and the MR image Bm0 from the storage 13. Further, the image acquisition unit 21 acquires the CT images Bc0 and the MR images Bm0 of a large number of subjects in order to train the discriminator 23 which will be described below.

Figure 3:
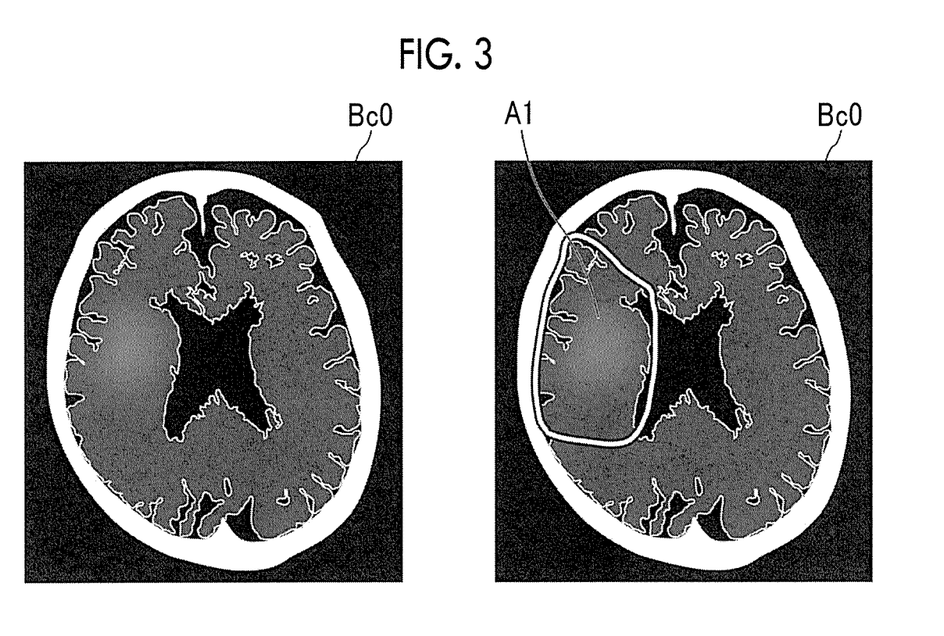
FIG. 3 is a diagram illustrating a data set of a CT image and a thrombus region.
Figure 4:
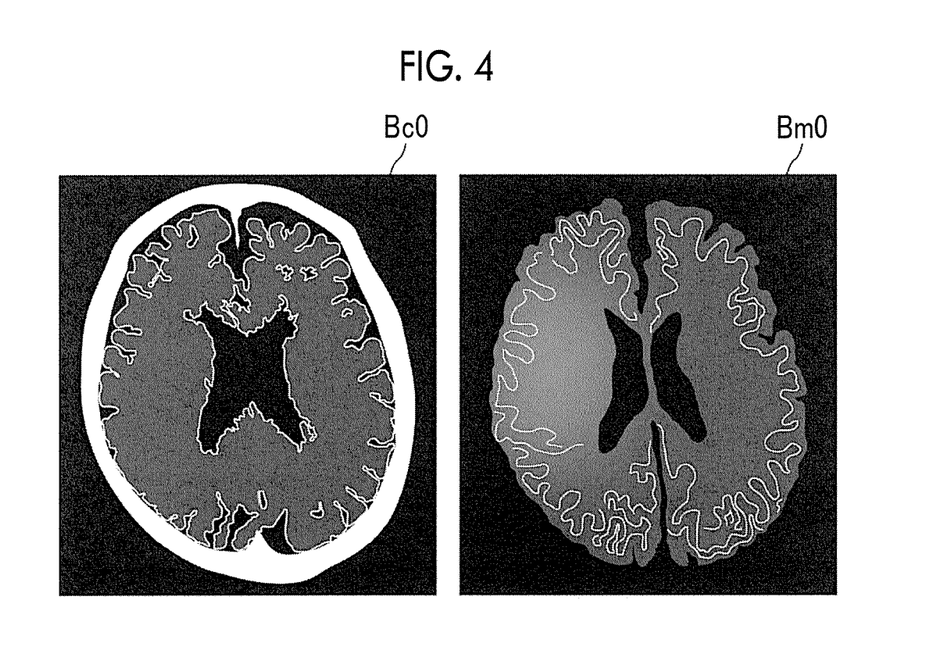
FIG. 4 is a diagram illustrating a data set of a CT image and an MR image.

The learning unit 22 trains the discriminator 23. FIG. 3 is a diagram illustrating an example of a data set of the CT image Bc0 and an infarction region A1 and FIG. 4 is a diagram illustrating registration between a CT image and an MR image. In FIG. 3, the CT image Bc0 is a three-dimensional image. However, here, for ease of description, a two-dimensional tomographic image in one tomographic plane of the CT image Bc0 is used. In FIG. 4, each of the CT image Bc0 and the MR image Bm0 is a three-dimensional image. However, here, for ease of understanding, the description will be made using a two-dimensional tomographic image in one corresponding tomographic plane of the CT image Bc0 and the MR image Bm0.

The learning unit 22 trains the discriminator 23 that discriminate an infarction region in the input CT image Bc1, using a data set of the CT image Bc0 and the infarction region A1 specified in the CT image Bc0 as training data, as illustrated in FIG. 3. In addition, the learning unit 22 trains the discriminator 23, using a data set of an image set of the CT image Bc0 and the MR image Bm0 registered with each other as training data, such that an MR estimated image Dm1 obtained by estimating the MR image obtained by capturing an image of the same subject as that in the input CT image Bc1 is output, as illustrated in FIG. 4.

Here, the registration between the CT image Bc0 and the MR image Bm0 can be performed by a registration unit (not illustrated) provided in the learning unit 22. The registration unit performs the registration between the CT images Bc0 and the MR images Bm0 of a large number of subjects acquired by the image acquisition unit 21. As illustrated in FIG. 4, the shape of the brain is almost the same in the same subject. In the MR image Bm0, an infarction region has a larger pixel value (higher signal value) than other regions. In contrast, the CT image Bc0 includes the skull and the brain parenchyma unlike the MR image Bm0 which is a diffusion-weighted image. Therefore, the registration unit extracts a brain parenchyma region as a brain region from the CT image Bc0 and performs the registration between the extracted brain region and the MR image Bm0.

In this embodiment, the registration unit registers one of the CT image Bc0 and the MR image Bm0 with the other, using a rigid registration method. In this embodiment, the CT image Bc0 is registered with the MR image Bm0. However, the MR image Bm0 may be registered with the CT image Bc0. In addition, a non-rigid registration method may be used as the registration method. For example, a method which non-linearly converts a feature point in the CT image Bc0 into a correspondence point corresponding to a feature point in the MR image Bm0 using a function, such as a B-spline or a thin-plate spline, can be used as the non-rigid registration method. However, the present disclosure is not limited thereto.

In this embodiment, the registration unit is provided in the learning unit 22. However, the present disclosure is not limited thereto. For example, the disease region discrimination apparatus 1 may comprise a new registration unit or a new registration unit may be provided separately from the disease region discrimination apparatus 1.

Figure 5:
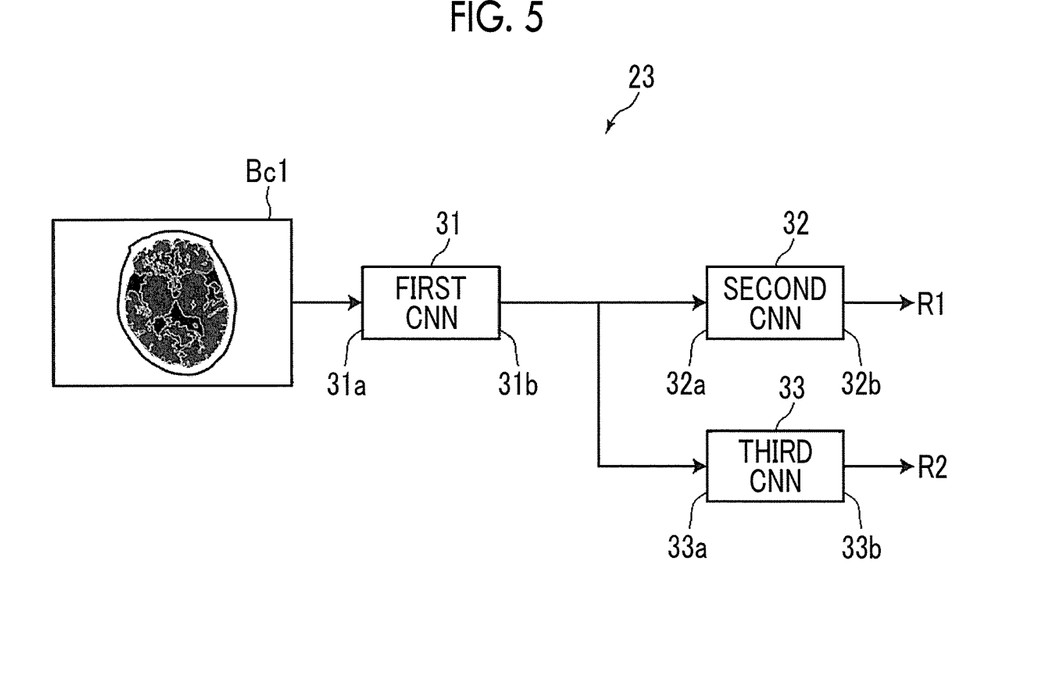
FIG. 5 is a diagram schematically illustrating the configuration of a discriminator.

Next, the discriminator 23 will be described. The discriminator 23 discriminates a disease region in the CT image Bc1. In this embodiment, for example, an infarction region is used as the disease region. In this embodiment, it is assumed that the discriminator 23 includes a plurality of convolutional neural networks (hereinafter, referred to as CNNs) which are one of multi-layer neural networks that have a plurality of processing layers hierarchically connected to each other and are subjected to deep learning.

FIG. 5 is a diagram schematically illustrating the configuration of the discriminator 23 in this embodiment. As illustrated in FIG. 5, the discriminator 23 includes the first CNN 31, the second CNN 32, and the third CNN 33. The first CNN 31, the second CNN 32, and the third CNN 33 are configured to have a plurality of processing layers including input layers 31a, 32a, and 33a as input units and output layers 31b, 32b, and 33b as output units, respectively. The output layer 31b of the first CNN 31 is connected to the input layer 32a of the second CNN 32 and the input layer 33a of the third CNN 33. The first CNN 31 corresponds to a common learning unit according to the present disclosure, the second CNN 32 corresponds to a first learning unit according to the present disclosure, and the third CNN 33 corresponds to a second learning unit according to the present disclosure.

The processing layers of the first CNN 31, the second CNN 32, and the third CNN 33 include at least one of a convolutional layer or a pooling layer. The convolutional layer performs a convolution process using various kernels for an input image and outputs a feature amount map including feature amount data obtained by the convolution process. The kernel has a size of n×n pixels (for example, n=3) and a weight is set to each element. Specifically, a weight, such as a differential filter that enhances the edge of a two-dimensional image, such as the CT image Bc1 or a feature amount map, is set. The convolutional layer applies the kernel to the entire CT image Bc1 or the entire feature amount map while shifting the pixel of interest of the kernel. In addition, the convolutional layer applies an activation function, such as a sigmoid function, to the value subjected to convolution and outputs a feature amount map.

The pooling layer pools the feature amount map output from the convolutional layer to reduce the amount of data of the feature amount map and outputs the feature amount map whose amount of data has been reduced.

In this embodiment, the convolution process using a two-dimensional kernel is used. However, the technology according to the present disclosure is not limited thereto. For example, a convolution process using a three-dimensional filter may be used. For example, in a case in which a three-dimensional kernel is used, the kernel has a size of n×n×n voxels (for example, n=3) and a weight is set to each element.

In this embodiment, the first CNN 31 and the second CNN 32 are trained, using a data set of a large number of CT images Bc0 of the brain including an infarction region and the infarction region A1 specified in the CT images Bc0 as training data, so as to output a discrimination result R1 of the infarction region for each pixel included in the input CT image Bc1. In a case in which the CT image Bc1 is input to the input layer 31a of the first CNN 31, among a plurality of processing layers of the first CNN 31 and the second CNN 32, a feature amount map output from a processing layer in the previous stage is sequentially input to a processing layer in the next stage and the discrimination result R1 of the infarction region for each pixel of the CT image Bc1 is output from the output layer 32b of the second CNN 32. In addition, the discrimination result R1 output from the second CNN 32 is the result of discriminating whether each pixel of the CT image Bc1 is an infarction region or a region other than the infarction region.

In addition, the first CNN 31 and the third CNN 33 are trained, using a data set of an image set obtained by the registration between a large number of CT image Bc0 of the brain and the MR images Bm0 obtained by capturing the images of the same subject as that in the CT image Bc0, so as to output, as a discrimination result R2, the MR estimated image Dm1 which is an estimated image of the MR image obtained by capturing an image of the same subject as that in the input CT image Bc1.

Figure 6:
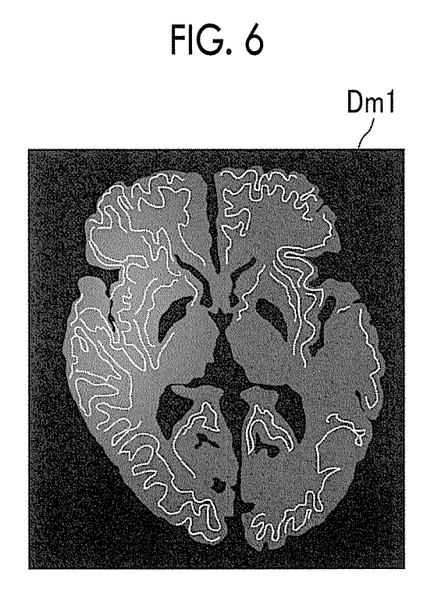
FIG. 6 is a diagram illustrating an example of an MR estimated image.

In general, since a difference in signal value between an infarction region and other regions is not so large in the CT image Bc1 of the brain, it is difficult to extract the infarction region using the CT image Bc1. In contrast, the MR image which is a diffusion-weighted image is an image that does not include the skull and includes only a soft tissue, such as brain parenchyma (see the MR image Bm0 on the right side in FIG. 5). In the MR image, the infarction region has a larger pixel value (higher signal value) than other regions. Therefore, the learning unit 22 trains the discriminator 23 so as to output the MR estimated image Dm1 obtained by estimating the MR image of the brain on the basis of the CT image Bc1, which makes it possible to check the pixel value of the MR image and the image features of the CT image. FIG. 6 is a diagram illustrating an example of the MR estimated image Dm1. The MR estimated image Dm1 is a three-dimensional image. However, here, the description will be made using a two-dimensional tomographic image in one corresponding tomographic plane of the MR estimated image Dm1 for ease of understanding. As illustrated in FIG. 6, the MR estimated image Dm1 which is an estimated image of the MR image that is a diffusion-weighted image does not include the skull and includes only a soft tissue such as the brain parenchyma.

As described above, in a case in which the CT image Bc1 is input to the input layer 31a of the first CNN 31, among a plurality of processing layers of the first CNN 31 and the third CNN 33, a feature amount map output from a processing layer in the previous stage is sequentially input to a processing layer in the next stage and the MR estimated image Dm1 is output as the discrimination result R2 from the output layer 33b of the third CNN 33.

In this embodiment, the feature amount map output from the output layer 31b of the first CNN 31 is input to both the input layer 32a of the second CNN 32 and the input layer 33a of the third CNN 33. That is, the first CNN 31 outputs the feature amount map common to a case in which the infarction region is discriminated and a case in which the MR estimated image is output.

Since the infarction region has a large pixel value in the MR image, it is considered that the commonality between the image feature important in estimating the MR image from the CT image and the image feature important in extracting the infarction region from the CT image is high. Therefore, in this embodiment, the common feature amount map output from the output layer 31b of the first CNN 31 is input to the input layers 32a and 33a of the second and third CNNs 32 and 33. Then, the discrimination result R1 of the infarction region in the CT image Bc1 is output from the output layer 32b of the second CNN 32 and the MR estimated image Dm1 based on the CT image Bc1 is output as the discrimination result R2 from the output layer 33b of the third CNN 33.

Figure 7:
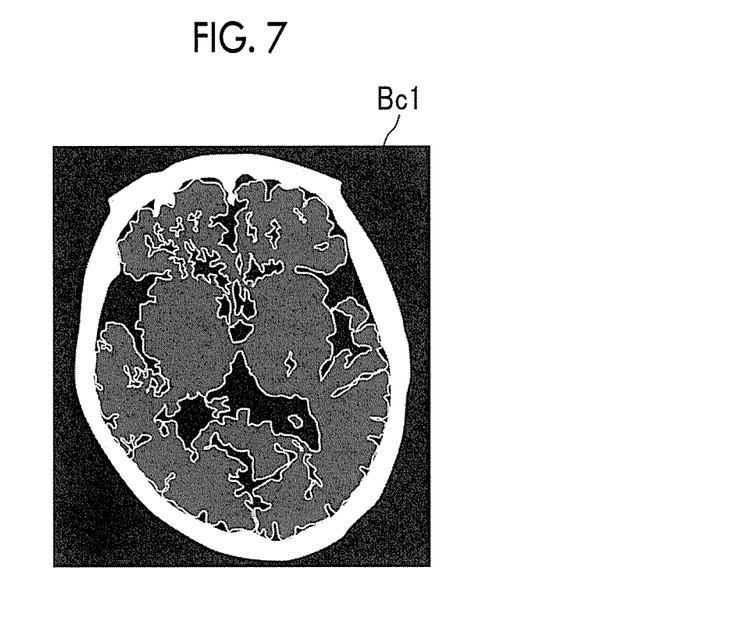
FIG. 7 is a diagram illustrating a CT image of the brain which is a discrimination target.

FIG. 7 is a diagram illustrating the CT image Bc1 of the brain which is a discrimination target. The CT image Bc1 is a three-dimensional image. However, here, the description will be made using a two-dimensional tomographic image in one corresponding tomographic plane of the CT image Bc1 for ease of understanding. For example, as illustrated in FIG. 7, in a non-contrast-enhanced CT image Bc1, the infarction region has a light color and it is difficult to prepare a large amount of data indicating a correct region. In this embodiment, the first CNN 31 learns not only the data indicating a correct infarction region but also the task of estimating the MR estimated image Dm1 from the CT image Bc1. That is, not only the knowledge of infarction but also the knowledge of estimating the MR estimated image Dm1 is reflected in the discrimination result R1 of the infarction region output from the second CNN 32. Therefore, the accuracy of the discrimination result is improved.

Figure 8:
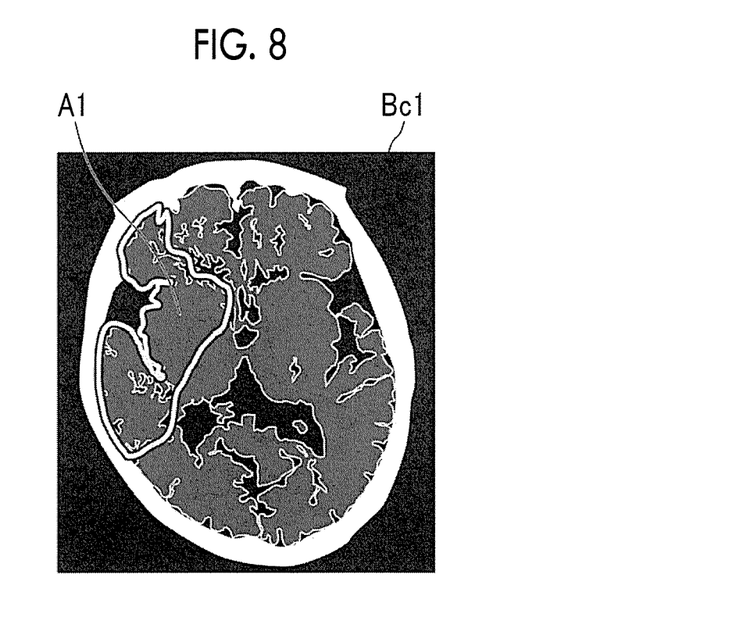
FIG. 8 is a diagram illustrating a displayed CT image of the brain.

The display control unit 24 displays the brain image in which the infarction region has been discriminated on the display unit 14. FIG. 8 is a diagram illustrating the displayed CT image of the brain. In addition, FIG. 8 illustrates a slice image in one tomographic plane of the CT image Bc1. The infarction region A1 discriminated in the CT image Bc1 is displayed so as to be surrounded by a line as illustrated in FIG. 8. In addition, the display control unit 24 may display the infarction region A1 in any aspect on the display unit 14. For example, the display control unit 24 may display the infarction region A1 so as to be hatched, may give a specific color to the infarction region A1, may apply an arrow to the infarction region A1, or may highlight the infarction region A1 differently from other regions.

Figure 9:
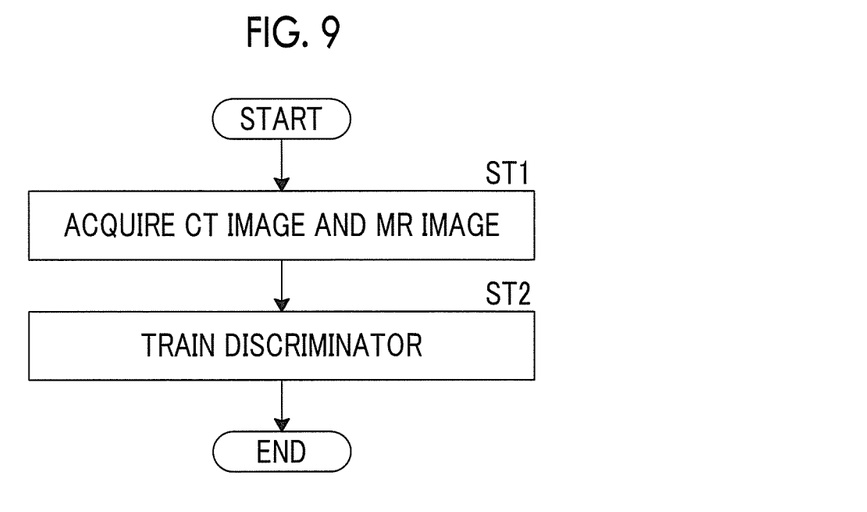
FIG. 9 is a flowchart illustrating a process performed during learning.

Next, a process performed in this embodiment will be described. FIG. 9 is a flowchart illustrating a process performed during learning in this embodiment. First, the image acquisition unit 21 acquires the CT images Bc0 and the MR image Bm0 of the brain of the subject that has developed cerebral infarction (Step ST1). Then, the learning unit 22 trains the discriminator 23, using the infarction region specified in the CT image Bc0 as training data, so as to discriminate an infarction region in the input CT image Bc1 and trains the discriminator 23, using a data set of an image set of the CT image Bc0 and the MR image Bm0 registered with each other as training data, such that the MR estimated image Dm1 is output from the input CT image Bc1 (Step ST2). Then, the process ends.

Figure 10:
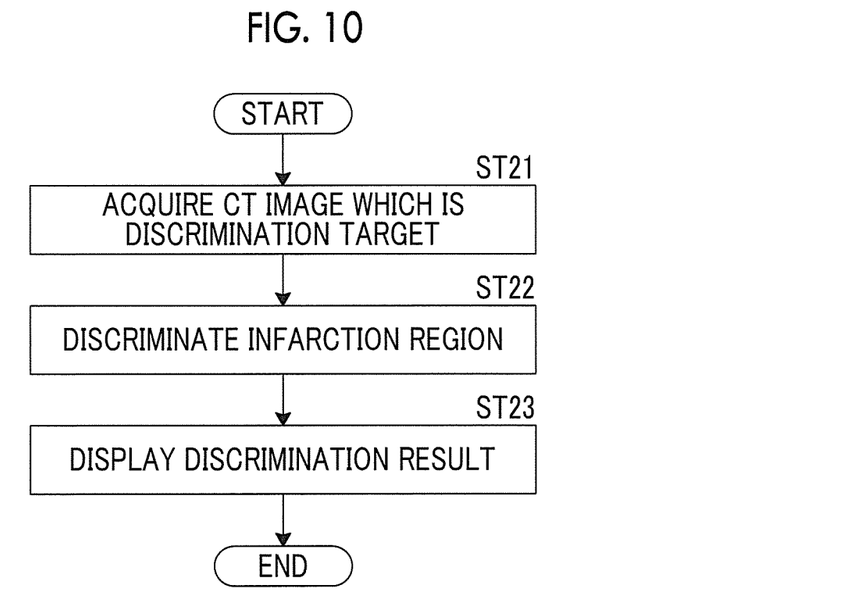
FIG. 10 is a flowchart illustrating a process performed during the discrimination of an infarction region.

FIG. 10 is a flowchart illustrating a process performed during the discrimination of an infarction region in this embodiment. First, the image acquisition unit 21 acquires the CT image Bc1 which is a discrimination target (Step ST21) and the discriminator 23 discriminates an infarction region in the CT image Bc1 which is a discrimination target (Step ST22). Then, the display control unit 24 displays the CT image Bc1 in which the infarction region has been discriminated on the display unit 14 (Step ST23). Then, the process ends.

As described above, in this embodiment, the first CNN 31 and the second CNN 32 of the discriminator 23 discriminate an infarction region in the CT image Bc1 and the first CNN 31 and the third CNN 33 perform the process of estimating the MR estimated image Dm1 from the CT image Bc1. In this case, the feature amount map output from the output layer 31*b* of the first CNN 31 is input to both the input layer 32*a* of the second CNN 32 and the input layer 33*a* of the third CNN 33. That is, the first CNN 31 outputs the feature amount map common to a case in which the infarction region is discriminated and a case in which the MR estimated image Dm1 is estimated. In this embodiment the output layer 31*b* of the first CNN 31 outputs the feature amount map. However the output layer 31*b* may output a feature amount data of an input image. Here, the feature amount data is data that characterizes the input image and include a value calculated by a predetermined algorithm using one or more of luminance data, color data, edge information, etc. of the input image.

Therefore, the first CNN 31 is trained using not only the data indicating a correct infarction region but also the task of estimating the MR estimated image. That is, not only the knowledge of infarction but also the knowledge of estimating the MR estimated image is reflected in the discrimination result of the infarction region output from the second CNN 32. As a result, the accuracy of the discrimination result is improved. Therefore, in this embodiment, it is possible to discriminate a disease region with high accuracy using a limited amount of data even in an image in which it is difficult to prepare a large amount of data indicating a correct disease region.

In the above-described embodiment, two CNNs 32 and 33 are provided as a plurality of learning units according to the present disclosure. However, the technology according to the present disclosure is not limited thereto and two or more CNNs may be provided. For example, a learning unit that can be used to extract an infarction region from a CT image may be further provided in order to extract an infarction region from, for example, a PET image, an ultrasound image, a T1 image, and a T2 image.

In the above-described embodiment, the disease is infarction. However, the technology according to the present disclosure is not limited thereto. For example, the disease may be thrombus or bleeding.

In the above-described embodiment, the CT image is used as the first image according to the present disclosure. However, the technology according to the present disclosure is not limited thereto. For example, the first image according to the present disclosure may be other medical images, such as a PET image, an ultrasound image, a T1 image, a T2 image, and a diffusion-weighted image. The diffusion-weighted image is used as the second image according to the present disclosure. However, the technology according to the present disclosure is not limited thereto. For example, the second image according to the present disclosure may be other medical images, such as a PET image, an ultrasound image, a T1 image, and a T2 image, as long as it is different from the first image. The effect of the technology according to the present disclosure is further improved in a case in which the first image is an image which is easy to capture and in which the discrimination of a disease region is more difficult than that in the second image and the second image is an image which is more difficult to capture than the first image and in which the discrimination of a disease region is easier than that in the first image.

In the above-described embodiment, the brain image is used as the medical image. However, the technology according to the present disclosure is not limited thereto. For example, the present disclosure may also be applied to a case in which medical characteristics included in the medical images of the chest, abdomen, whole body, and limbs of the human body are discriminated.

In the above-described embodiment, the convolutional neural network is used as each CNN. However, the technology according to the present disclosure is not limited thereto. For example, neural networks including a plurality of processing layers, such as a deep neural network (DNN) and a recurrent neural network (RNN) may be used. In addition, all neural networks may not be the same neural network. For example, the first CNN 31 may be a convolutional neural network and the other CNNs may be recurrent neural networks. The type of CNN may be appropriately changed.

In the above-described embodiment, the CNNs other than the first CNN 31 which is the common learning unit according to the present disclosure are not connected to each other. However, in the technology according to the present disclosure, the CNNs other than the first CNN 31 may be connected to each other.

In the above-described embodiment, the non-contrast-enhanced CT images are used as the CT images Bc1 and Bc0. However, both the contrast-enhanced CT image and the non-contrast-enhanced CT image may be used to train the discriminator 23. As such, the use of the trained discriminator 23 makes it possible to discriminate a disease region even in a case in which the CT image which is a discrimination target is either a contrast-enhanced CT image or a non-contrast-enhanced CT image.

In the above-described embodiment, for example, the following various processors can be used as the hardware structure of processing units performing various processes, such as the image acquisition unit 21, the learning unit 22, the discriminator 23, and the display control unit 24. The various processors include a CPU which is a general-purpose processor executing software (program) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs and a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured by using one or more of the various processors as a hardware structure.

In addition, specifically, an electric circuit (circuitry) obtained by combining circuit elements, such as semiconductor elements, can be used as the hardware structure of the various processors.

EXPLANATION OF REFERENCES

1: disease region discrimination apparatus
2: three-dimensional imaging apparatus
3: image storage server
4: network
11: CPU
12: memory
13: storage
14: display unit
15: input unit
21: image acquisition unit
22, 22-2: learning unit
23: discriminator
24: display control unit
31: first CNN (common learning unit)
32: second CNN (first learning unit)
33: third CNN (second learning unit)
A1: infarction region
Bc1: CT image as discrimination target
Bc0: CT image including infarction region
Bm0: MR image including infarction region
Dm1: estimated MR image

What is claimed is:

1. A method training a discriminator which is implemented by an electronic device having a hardware processor and comprising a common learning unit that includes an input unit and an output unit and a plurality of learning units each of which includes an input unit which is connected to the output unit of the common learning unit and an output unit, the method comprising:

training the discriminator by the hardware processor, using a plurality of data sets of a first image obtained by capturing an image of a subject that has developed a disease and an image data of a disease region in which the disease appears in the first image, such that information indicating the disease region is output from the output unit of a first learning unit among the plurality of learning units in a case in which the first image is input to the input unit of the common learning unit; and training the discriminator by the hardware processor, using a plurality of data sets of an image set obtained by registration between the first image and a second image which is obtained by capturing an image of the same subject as described above and whose type is different from a type of the first image, such that an estimated image of the second image is output from the output unit of a second learning unit among the plurality of learning units in a case in which the first image is input to the input unit of the common learning unit.

2. The learning method according to claim 1,
wherein the common learning unit is trained by the hardware processor, using the plurality of data sets of a first image and an image data of the disease region in which the disease appears in the first image and the plurality of data sets of an image set obtained by registration between the first image and a second image, such that a feature amount data of the medical image is output from the output unit of the common learning unit in a case in which the medical image is input to the input unit of the common learning unit.

3. The learning method according to claim 1,
wherein the first image and the second image are captured under different imaging conditions.

4. The learning method according to claim 1,
wherein the first image and the second image are captured by different imaging principles.

5. The learning method according to claim 1,
wherein the first image is a computed tomography (CT) image and the second image is a magnetic resonance (MR) image.

6. The learning method according to claim 5,
wherein the MR image is a diffusion-weighted image.

7. The learning method according to claim 1,
wherein the subject is a brain of a patient that has developed cerebral infarction, and
the disease region is an infarction region.

8. The learning method according to claim 2,
wherein the subject is a brain of a patient that has developed cerebral infarction, and
the disease region is an infarction region.

9. The learning method according to claim 5,
wherein the subject is a brain of a patient that has developed cerebral infarction, and
the disease region is an infarction region.

10. The learning method according to claim 1,
wherein each of the common learning unit and the plurality of learning units is a neural network that comprises an input layer as the input unit, a plurality of intermediate layers, and an output layer as the output unit.

11. A apparatus training a discriminator which is implemented by an electronic device having a hardware processor and comprising a common learning unit that includes an input unit and an output unit and a plurality of learning units each of which includes an input unit which is connected to the output unit of the common learning unit and an output unit, the learning apparatus configured to:

train the discriminator by the hardware processor, using a plurality of data sets of a first image obtained by capturing an image of a subject that has developed a disease and an image data of a disease region in which the disease appears in the first image, such that information indicating the disease region is output from the output unit of a first learning unit among the plurality of learning units in a case in which the first image is input to the input unit of the common learning unit; and train the discriminator by the hardware processor, using a plurality of data sets of an image set obtained by registration between the first image and a second image which is obtained by capturing an image of the same subject as described above and whose type is different from a type of the first image, such that an estimated image of the second image is output from the output unit of a second learning unit among the plurality of learning units in a case in which the first image is input to the input unit of the common learning unit.

12. A learning apparatus according to claim 11, further configured to:
train the common learning unit by the hardware processor, using the plurality of data sets of a first image obtained by capturing an image of a subject that has developed the disease and an image data of the disease region in which the disease appears in the first image and the plurality of data sets of an image set obtained by registration between the first image and a second image, such that a feature amount data of the medical image is output from the output unit of the common learning unit in a case in which the medical image is input to the input unit of the common learning unit.

13. A non-transitory computer readable medium for storing a learning program training a discriminator which is implemented by an electronic device having a hardware processor and comprising a common learning unit that includes an input unit and an output unit and a plurality of learning units each of which includes an input unit which is connected to the output unit of the common learning unit and an output unit, the learning program causing a computer to perform:
a process of training the discriminator by a hardware processor, using a plurality of data sets of a first image obtained by capturing an image of a subject that has developed a disease and an image data of a disease region in which the disease appears in the first image, such that information indicating the disease region is output from the output unit of a first learning unit among the plurality of learning units in a case in which the first image is input to the input unit of the common learning unit; and
a process of training the discriminator by the hardware processor, using a plurality of data sets of an image set obtained by registration between the first image and a second image which is obtained by capturing an image of the same subject as described above and whose type is different from a type of the first image, such that an estimated image of the second image is output from the output unit of a second learning unit among the plurality of learning units in a case in which the first image is input to the input unit of the common learning unit.

14. A non-transitory computer readable medium for storing a learning program according to claim 13, the learning program further causing a computer to perform:
a process of training the common learning unit by the hardware processor, using the plurality of data sets of a first image obtained by capturing an image of a subject that has developed the disease and an image data of the disease region in which the disease appears in the first image and the plurality of data sets of an image set obtained by registration between the first image and a second image, such that a feature amount data of the medical image is output from the output unit of the common learning unit in a case in which the medical image is input to the input unit of the common learning unit.

15. A discriminator that is trained by the learning method according to claim 1.

16. A discriminator that is trained by the learning apparatus according to claim 11.

17. A discriminator that is trained by the learning program according to claim 13.

18. A disease region discrimination apparatus comprising:
a processor configured to acquire a first image which is a discrimination target; and
the discriminator according to claim 15 that discriminates a disease region in the first image which is the discrimination target.

19. The disease region discrimination apparatus according to claim 18,
the processor displays a discrimination result of the discriminator on a displayer.

20. A non-transitory computer readable medium for storing a disease region discrimination program that causes a computer to perform:
a process of acquiring a first image which is a discrimination target; and
a process of allowing the discriminator according to claim 15 to discriminate a disease region in the first image which is the discrimination target.

* * * * *